United States Patent
Kim et al.

(10) Patent No.: US 11,817,977 B2
(45) Date of Patent: Nov. 14, 2023

(54) METHOD OF DETERMINING SINGLE SAMPLING FREQUENCY OF CLASSIFICATION TARGET SIGNAL IN ORDER TO PREDICT MODULATION TYPE OF CLASSIFICATION TARGET SIGNAL, AND METHOD AND APPARATUS FOR PREDICTING MODULATION TYPE BY USING CLASSIFICATION TARGET SIGNAL SAMPLED WITH SINGLE SAMPLING FREQUENCY

(71) Applicant: ELECTRONICS AND TELECOMMUNICATIONS RESEARCH INSTITUTE, Daejeon (KR)

(72) Inventors: Byung Chan Kim, Daejeon (KR); Kang Hee Kim, Daejeon (KR); Haeng Sook Ro, Daejeon (KR); Gwang Moon Park, Daejeon (KR); Soo Ho Sohn, Daejeon (KR); Ki Cheol Tae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/710,625

(22) Filed: Mar. 31, 2022

(65) Prior Publication Data

US 2023/0066195 A1    Mar. 2, 2023

(30) Foreign Application Priority Data

Aug. 18, 2021    (KR) .......... 10-2021-0108799

(51) Int. Cl.
*H04B 3/46* (2015.01)
*H04L 27/00* (2006.01)

(52) U.S. Cl.
CPC ...... *H04L 27/0012* (2013.01); *H04L 27/0006* (2013.01)

(58) Field of Classification Search
CPC ........ G06N 3/0454; G04N 3/08; G04N 3/045; H04L 27/12; H04L 27/14; H04L 27/22; H04L 27/20
USPC ...................................................... 375/224
See application file for complete search history.

(56) References Cited

U.S. PATENT DOCUMENTS

| | | | |
|---|---|---|---|
| 9,071,497 B2 | 6/2015 | Kim et al. | |
| 9,194,936 B1* | 11/2015 | Keegan | H04L 27/28 |
| 2006/0115013 A1 | 6/2006 | Kim et al. | |
| 2022/0217619 A1* | 7/2022 | Robinson | H04W 48/16 |
| 2022/0284270 A1* | 9/2022 | Govea | H04L 27/14 |

FOREIGN PATENT DOCUMENTS

KR    10-1910540 B1    10/2018

* cited by examiner

*Primary Examiner* — Khai Tran
(74) *Attorney, Agent, or Firm* — Rabin & Berdo, P.C.

(57) ABSTRACT

In the present invention, in classifying modulation types of a plurality of modulation signals by using a classifier (an artificial neural network model based on machine learning), the classifier may classify the modulation types of the modulation signals by using pieces of I/Q data, sampled with one sampling frequency, as input data, and thus, may quickly classify the modulation signals.

13 Claims, 4 Drawing Sheets

METHOD OF DETERMINING SINGLE SAMPLING FREQUENCY OF CLASSIFICATION TARGET SIGNAL IN ORDER TO PREDICT MODULATION TYPE OF CLASSIFICATION TARGET SIGNAL, AND METHOD AND APPARATUS FOR PREDICTING MODULATION TYPE BY USING CLASSIFICATION TARGET SIGNAL SAMPLED WITH SINGLE SAMPLING FREQUENCY

CROSS-REFERENCE TO RELATED APPLICATIONS

This application claims the benefit of the Korean Patent Application No. 10-2021-0108799 filed on Aug. 18, 2021, which is hereby incorporated by reference as if fully set forth herein.

BACKGROUND

Field of the Invention

The present invention relates to technology for classifying a modulation type by using machine learning technology.

Discussion of the Related Art

Technology for recognizing a modulation type of a wireless signal is being widely used to detect an unwanted/unlicensed signal in radio wave monitoring field.

In order to recognize a modulation type of a wireless signal, current voice recognition and natural language processing technology and technology for classifying a modulation type of a wireless signal by using an artificial neural network model based on machine learning widely known in classifying continuous data have been developed.

An artificial neural network model of the related art used to classify a modulation signal of a wireless signal recognizes a modulation signal of a wireless signal by using, as input data, I data having an in-phase component and Q data having a quadrature-phase component of the wireless signal.

According to Nyquist sampling theory widely known for restoring an original wireless signal, the original wireless signal should be sampled by two or more times a maximum frequency bandwidth of the wireless signal.

A number of different sampling frequencies are needed for restoring wireless signals having different frequency bandwidths. In this case, in a receiver, due to an operation of switching a specific sampling frequency to another specific sampling frequency, a speed for obtaining I/Q data sampled with different sampling frequencies from a wireless signal may be inevitably slowed. Due to this, an effect thereof is reduced at a radio wave monitoring site requiring the quick classification of a signal.

In a case which is for classifying a modulation type of a wireless signal through an artificial neural network model using a feature, obtained from I/Q data, as input data instead of accurately restoring a waveform of an original wireless signal, the modulation type of a wireless signal may be sufficiently classified by recognizing only a difference of features of the wireless signal.

Therefore, a modulation type of a corresponding wireless signal may be quickly recognized by using one standardization frequency (hereinafter referred to as a single standardization frequency) without using a different sampling frequency for each wireless signal.

However, research on an artificial neural network model which classifies a modulation type by using I/Q data sampled with a single sampling frequency is still insufficient.

SUMMARY

An aspect of the present invention is directed to providing a method of determining a single sampling frequency of a classification target signal in order to predict a modulation type of the classification target signal.

Another aspect of the present invention is directed to providing a method and apparatus for predicting a modulation type (a modulation mode, a modulation pattern, or a modulation type) by using a classification target signal sampled with a single sampling frequency in a multi-frequency environment.

The objects of the present invention are not limited to the aforesaid, but other objects not described herein will be clearly understood by those skilled in the art from descriptions below.

To achieve these and other advantages and in accordance with the purpose of the invention, as embodied and broadly described herein, there is provided a method of classifying a modulation type of a classification target signal by using a single sampling frequency in a receiving apparatus, the method including: extracting I data having an in-phase component and Q data having a quadrature-phase component, sampled with a single sampling frequency, from the classification target signal received from a transmitting apparatus by using a preprocessor; and analyzing features of the extracted I data and Q data to classify a modulation type of the classification target signal by using a classifier learned based on a machine learning method.

In an embodiment, the extracting may include: obtaining bandwidth values available in wireless communication between the transmitting apparatus and the receiving apparatus; calculating a mean value of the bandwidth values; calculating a variance value of the bandwidth values and the mean value; determining the calculated variance value as the single sampling frequency; and extracting the I data and the Q data on the basis of the determined single sampling frequency.

In an embodiment, the calculating of the mean value of the bandwidth values may include further generating the calculated mean value to increase the number of bandwidth values, so that the bandwidth values have a normal distribution characteristic.

In an embodiment, the method may further include, before the extracting, allowing the classifier to learn by using the machine learning method, wherein the allowing the classifier to learn may include: preparing training data including the I data and the Q data sampled with the single sampling frequency; and allowing the classifier to learn by using the training data.

In an embodiment, the single sampling frequency may be a variance value of bandwidth values available in wireless communication between the transmitting apparatus and the receiving apparatus and a mean value of the bandwidth values.

In another aspect of the present invention, there is provided a method of determining a single sampling frequency for extracting I data having an in-phase component and Q data having a quadrature-phase component input to a classifier in an apparatus including the classifier predicting a modulation type of a classification target signal by using a single sampling frequency in a receiving apparatus, the method including: calculating a mean value and a standard deviation value of a plurality of bandwidth values of the classification target signal; calculating a variance value of the bandwidth values, the mean value, and the standard deviation value; and determining the calculated variance value as the single sampling frequency.

In an embodiment, the calculating of the mean value and the standard deviation value may include further generating a bandwidth value corresponding to the calculated mean value and a bandwidth value corresponding to the standard deviation value to increase the number of bandwidth values, so that the bandwidth values have a normal distribution characteristic.

In another aspect of the present invention, there is provided a receiving apparatus for classifying a modulation type of a classification target signal by using a single sampling frequency, the receiving apparatus including: a preprocessor configured to extract I data having an in-phase component and Q data having a quadrature-phase component, sampled with the single sampling frequency, from the classification target signal received from a transmitting apparatus; and an analyzer configured to analyze features of the extracted I data and Q data to classify a modulation type of the classification target signal.

In an embodiment, the preprocessor may include: a first calculator configured to calculate a mean value of bandwidth values available in wireless communication between the transmitting apparatus and the receiving apparatus; a second calculator configured to calculate a variance value of the bandwidth values and the mean value; and an extractor configured to determine the variance value as the single sampling frequency and extract the I data and the Q data sampled with the determined single sampling frequency.

In an embodiment, the preprocessor may include: a first calculator configured to calculate a mean value and a standard deviation value of bandwidth values available in wireless communication between the transmitting apparatus and the receiving apparatus; a second calculator configured to calculate a variance value of the bandwidth values, the mean value, and the standard deviation value; and an extractor configured to determine the variance value as the single sampling frequency and extract the I data and the Q data sampled with the determined single sampling frequency.

In an embodiment, the classifier may be learned based on machine learning by using training data including the I data and the Q data sampled with the single sampling frequency.

In an embodiment, the machine learning may be supervised learning.

In an embodiment, the receiving apparatus may further include a demodulator configured to perform demodulation on the classification target signal on the basis of the modulation type of the classification target signal classified by the classifier.

It is to be understood that both the foregoing general description and the following detailed description of the present invention are exemplary and explanatory and are intended to provide further explanation of the invention as claimed.

DETAILED DESCRIPTION OF THE INVENTION

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims.

Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Hereinafter, embodiments of the present invention will be described in detail with reference to the accompanying drawings.

First, a method of determining a single standardization frequency in classifying modulation types of a plurality of modulation signals will be described, and an embodiment of the present invention to which the technical principle is applied will be described in detail.

Figure 1:
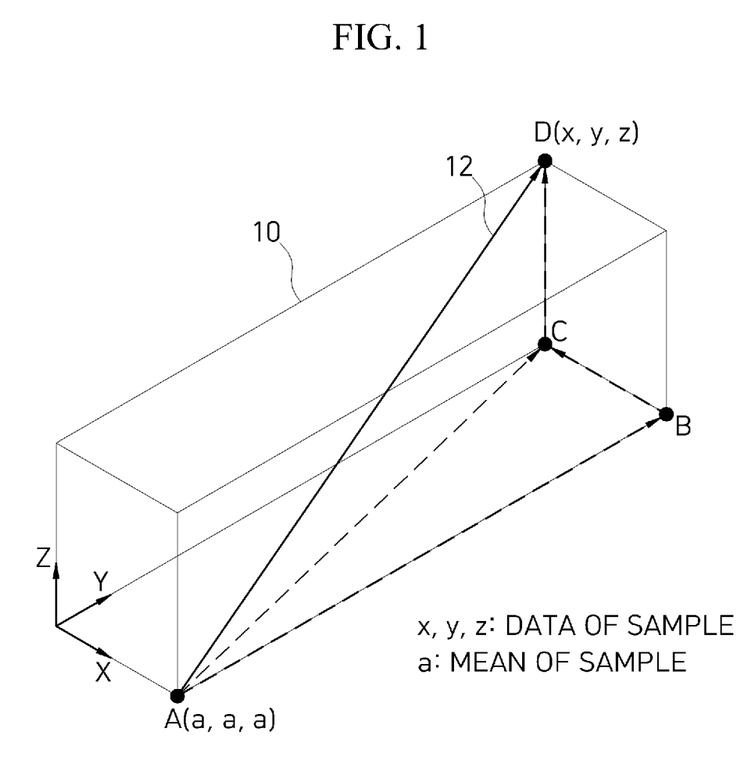
FIG. 1 is a conceptual diagram for describing a method of determining a single standardization frequency in classifying modulation types of a plurality of modulation signals according to an embodiment of the present invention.

FIG. 1 is a conceptual diagram for describing a method of determining a single standardization frequency in classifying modulation types of a plurality of modulation signals according to an embodiment of the present invention.

Referring to FIG. 1, when the number of samples is sufficient in statistical analysis, a random variable of sample data may commonly have the form of normal distribution. When the number of samples is small, it may be required that a sample is approximate to a normal distribution by adding data associated with sample data to control skewness representing the degree to which the sample deviates from symmetry and kurtosis corresponding to a parameter representing centralization of data.

Particularly, a standard deviation of data may include information about the irregularity, variability, uncertainty, and diffusion (dispersion) of data.

As illustrated in FIG. 1, in a case where a sample including three pieces of data is expressed in a space 10, a standard deviation may denote a shortest distance 12 between two points A and D of coordinates.

The standard deviation representing the shortest distance 12 in the space 10 of FIG. 1 may be expressed as the following Equation 1.

$$\text{standard deviation} = \sqrt{(x-a)^2+(y-a)^2+(z-a)^2} \quad \text{[Equation 1]}$$

In FIG. 1, a path from a point A to a point D may include a path (A→B→C→D) which passes through a point B and a point C and a path (A→C→D) which passes through only the point C, or a path (A→D) directly connecting the point A to the point D may be a shortest path.

In other words, the standard deviation may denote that a certain point is apart from each of a plurality of values by a minimum distance.

In the present invention, in a method of determining a representative value of a sampling frequency, by adding an arithmetic mean and/or a standard deviation of bandwidths other than bandwidths of classification target signals (or modulation signals) so that sample data (a sampling frequency) has a characteristic of a maximum normal distribution, the number of frequency bandwidths may increase, and then, a variance of increased frequency bandwidths may be determined as a representative value of the sampling frequency. That is, the present invention may select a variance instead of a standard deviation so as to increase the number of samples per symbol.

Figure 2:
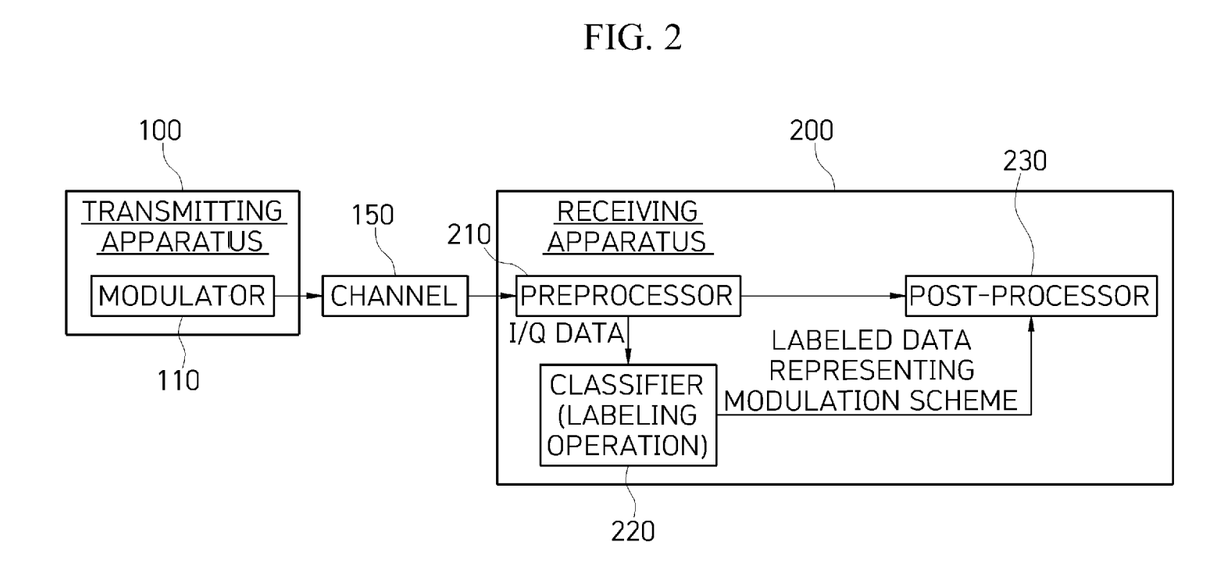
FIG. 2 is a block diagram illustrating an apparatus for predicting a modulation type of a classification target signal sampled with a single sampling frequency according to an embodiment of the present invention.

FIG. 2 is a block diagram illustrating an apparatus 200 for predicting a modulation type of a classification target signal sampled with a single sampling frequency according to an embodiment of the present invention.

Referring to FIG. 2, the apparatus 200 according to an embodiment of the present invention may be an apparatus for predicting a modulation type of a classification target signal sampled with a single sampling frequency, and for example, may be a receiving apparatus 200 which performs wireless communication with a transmitting apparatus 100 through a wireless communication channel 150.

The transmitting apparatus 100 may include a modulator 110 and may transmit a modulation signal, generated through modulation by the modulator 110, to the receiving apparatus 200 through the wireless communication channel 150. Hereinafter, a modulation signal may be referred to as a classification target signal.

The receiving apparatus 200 may predict (classify or recognize) a modulation signal of a classification target signal received from the transmitting apparatus 100 through the wireless communication channel 150, on the basis of machine learning.

To this end, the receiving apparatus 200 may include a preprocessor 210 and a classifier 220, and additionally, may further include a post-processor 230. Here, the post-processor 230 may be, for example, a demodulator which demodulates the classification target signal.

The preprocessor 210 may extract Q data having a quadrature-phase component and I data having an in-phase component, sampled with a single sampling frequency, from the classification target signal received from the transmitting apparatus 100.

The classification target signal (i.e., a received modulation signal) may be expressed as a complex signal having an IQ form for mathematical operation and hardware design. In a case where the complex signal is expressed through quadrature coordinates, an X axis may be expressed as a real number portion, and a Y axis may be expressed as an imaginary number portion.

I data having an in-phase component expressed as a real number portion may be expressed as $A\cos(\theta)$, and Q data having a quadrature-phase component expressed as an imaginary number portion may be expressed as $A\sin(\theta)$. Here, A may denote a moment amplitude of the classification target signal (the received modulation signal), and $\theta$ may denote a phase of the classification target signal (the received modulation signal).

The classification target signal (the received modulation signal (s(t)) may be expressed as the following Equation.

$$s(t)=(A_C+jA_S)e^{j2\pi ft+\theta}g(t-nT)$$

Here, $0 \leq t \leq nT$, $A_C$ may denote a magnitude of an in-phase component, and As may denote a magnitude of a quadrature-phase component. Also, g(t−nT) may denote a sampling pulse signal having a sampling frequency.

Technology for extracting I data and Q data through a mathematical operation has been widely known, and the present invention may have a feature I data and Q data are extracted through a sampling process based on a single sampling frequency, instead of a method of extracting I data and Q data from a classification target signal. That is, the present invention may provide a method of determining a single sampling frequency.

The present invention may quickly classify (recognize or predict) a modulation type of a modulation signal by using the below-described classifier 220. This is because features of I data and Q data sampled with only one sampling frequency are analyzed.

The classifier 220 may be an artificial neural network model which has been learned to classify a modulation type of a modulation signal by using, as input data, I/Q data sampled with a single sampling frequency input from the preprocessor 210. Here, machine learning may be, for example, supervised learning or long short-term memory (LSTM) where a recurrent neural network (RNN) extends.

That is, by using training data including I data and Q data sampled with the single sampling frequency, the classifier 220 may be learned based on supervised learning, the RNN, or the LSTM where the RNN extends.

The classifier 220 may analyze a feature of I/Q data sampled with a single sampling frequency and may perform a labeling operation on a recognized modulation type to output labeled data representing (identifying) the recognized modulation type.

Hereinafter, a method of determining a single sampling frequency by using the preprocessor illustrated in FIG. 2 will be described in detail with reference to FIG. 3.

Figure 3:
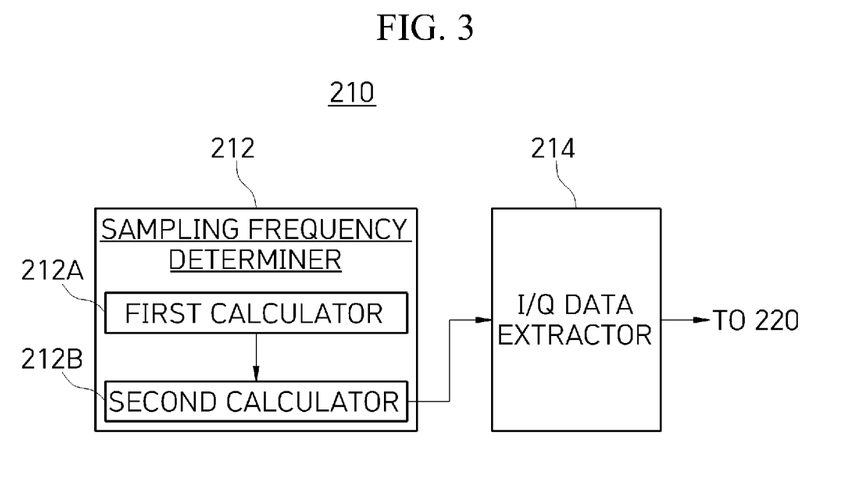
FIG. 3 is a block diagram schematically illustrating an internal configuration of a preprocessor illustrated in FIG. 2.

FIG. 3 is a block diagram schematically illustrating an internal configuration of the preprocessor 210 illustrated in FIG. 2.

Referring to FIG. 3, the preprocessor 210 may include a sampling frequency determiner 212 and an I/1 data extractor 214.

The sampling frequency determiner 212 may be an apparatus for determining a representative value of a sampling frequency (i.e., a single sampling frequency) and may include a first calculator 212A and a second calculator 212B.

The first calculator 212A may calculate a mean value and/or a standard deviation value of available bandwidths in wireless communication between the transmitting apparatus 100 and the receiving apparatus 200.

The reason that the mean value and/or the standard deviation value are calculated may be for increasing the number of bandwidth values so that the bandwidth values have a normal distribution characteristic.

When a bandwidth_#1 is A, bandwidth_#2 is B, a bandwidth_#3 is C, and a bandwidth_#4 is D, a mean value of four bandwidths may be expressed as the following Equation 2.

$$m = \frac{A+B+C+D}{4} \quad \text{[Equation 2]}$$

A standard deviation "σ" of the four bandwidths may be expressed as the following Equation 3.

$$\sigma = \sqrt{(A-m)^2+(B-m)^2+(C-m)^2+(D-m)^2} \quad \text{[Equation 3]}$$

Based on Equations 2 and 3, in addition to A, B, C, and D, a bandwidth value "m" and/or "σ" may be added, and thus, the total number of bandwidths may increase.

The second calculator 212B may calculate a variance value "v" on A, B, C, and D and a mean value "m" and/or a standard deviation value "σ" added by the first calculator 212A.

The variance value "v" may be expressed as the following Equation 4.

$$m' = \frac{A+B+C+D+m+\sigma}{4} \quad \text{[Equation 4]}$$

$$v = \frac{(A-m')^2+(B-m')^2+(C-m')^2+(D-m')^2+(m-m')^2++(\sigma-m')^2}{6}$$

Here, m' may denote a mean value of increased bandwidth values A, B, C, D, m, and σ. The variance value "v" may be calculated by dividing the sum of squares of values, obtained by subtracting the mean value "m'" from the bandwidth values, by a total number. That is, the variance value may denote a mean of squares of difference values.

As described based on Equations 2 to 4 for example, the sampling frequency determiner 212 may increase the number of sample data (bandwidth values) by adding an arithmetic mean and a standard deviation of bandwidths other than bandwidths of classification target signals so that sample data (bandwidth values) has a normal distribution characteristic maximally, for determining a representative value of a sampling frequency, and then, may determine a variance "v" of the increased sample data (bandwidth values) as a representative value (i.e., a single sampling frequency).

When a single sampling frequency is determined, the I/Q data extractor 214 may extract I/Q data sampled with the determined single sampling frequency from a classification target signal and may input the extracted I/Q data to the classifier 220.

Figure 4:
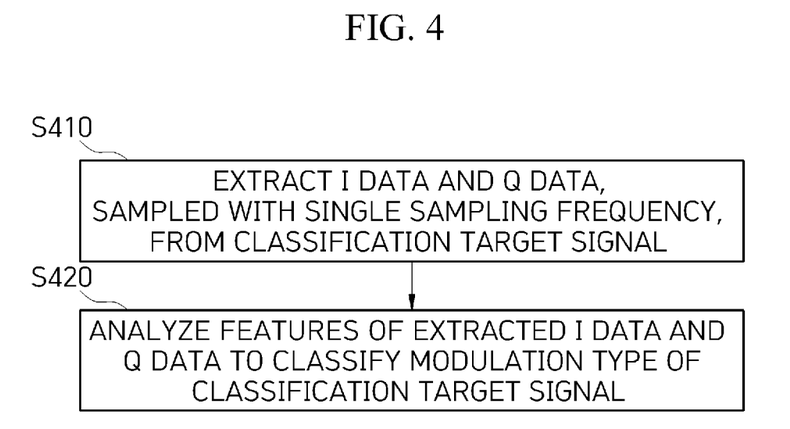
FIG. 4 is a flowchart illustrating a method of predicting a modulation type of a classification target signal sampled with a single sampling frequency according to an embodiment of the present invention.
Figure 5:
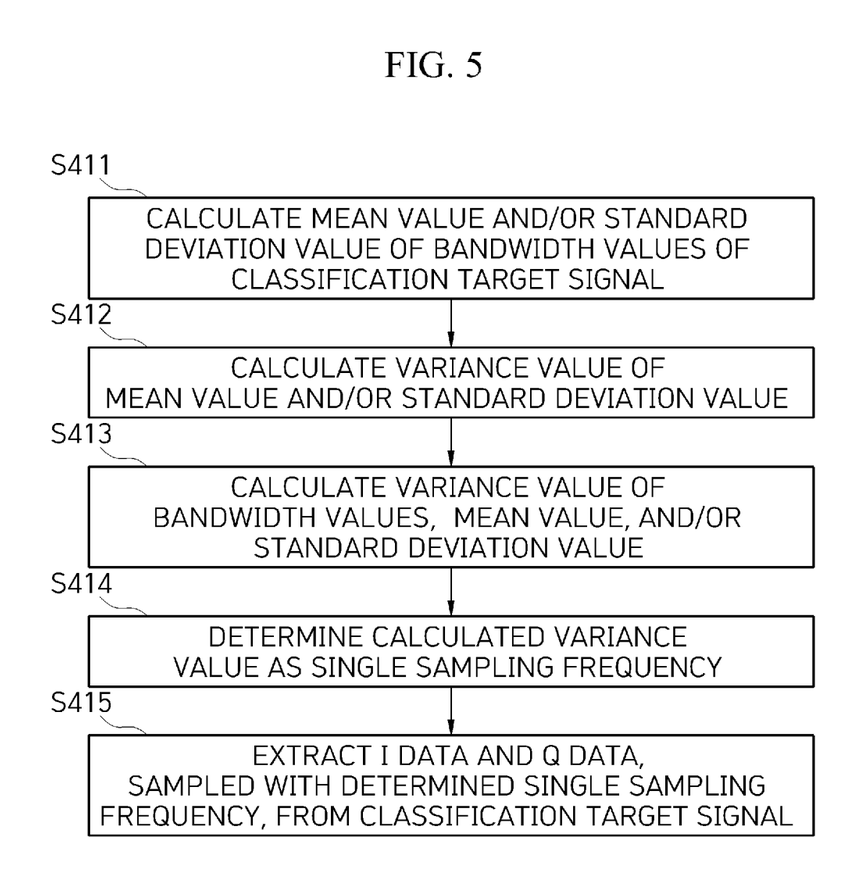
FIG. 5 is a detailed flowchart of step S410 illustrated in FIG. 4.

FIG. 4 is a flowchart illustrating a method of predicting a modulation type of a classification target signal sampled with a single sampling frequency according to an embodiment of the present invention. FIG. 5 is a detailed flowchart of step S410 illustrated in FIG. 4.

A main element for performing the following steps may be a computing device. The computing device may include at least one processor, memory, storage medium, and a system bus connecting the elements. When the preprocessor and the classifier illustrated in FIG. 2 is implemented as a software module, the preprocessor may control execution of the preprocessor and the classifier.

First, referring to FIG. 4, in step S410, a process of extracting I data having an in-phase component and Q data having a quadrature-phase component, sampled with a single sampling frequency, from the classification target signal received from a transmitting apparatus may be performed by a preprocessor.

Subsequently, in step S420, a process of analyzing features of the extracted I data and Q data to classify (recognize or predict) a modulation type of the classification target signal may be performed by a classifier learned based on a machine learning method.

In an embodiment, before step S410, a process of allowing the classifier to learn by using the machine learning method may be further performed. In this case, the process of allowing the classifier to learn may include a process of allowing the classifier to learn by using training data including the I data and the Q data sampled with the single sampling frequency. Here, the single sampling frequency may be a variance value which is calculated by using bandwidth values available in a wireless communication environment (a multi-frequency environment) between the transmitting apparatus and the receiving apparatus and a mean value of the bandwidth values.

Referring to FIG. 5, step S410 may include a process (S411) of calculating a mean value and/or a standard deviation value of the bandwidth values of the classification target signal, a process (S412) of calculating a variance value of the mean value and/or the standard deviation value, a process (S413) of calculating a variance value of the bandwidth values, the mean value, and/or the standard deviation value, a process (S414) of determining the calculated variance value as the single sampling frequency, and a process (S415) of extracting the I data and the Q data, sampled with the determined single sampling frequency, from the classification target signal.

In an embodiment, the process (S411) may include a process of generating the calculated mean value (a bandwidth value corresponding to a mean value) and/or the calculated standard deviation value (a bandwidth value corresponding to a standard deviation value) other than the bandwidth values to increase the number of bandwidth values, so that the bandwidth values have a normal distribution characteristic.

Validity Evaluation

The inventor has evaluated a validity of the present invention with respect to six modulation signals respectively having bandwidths which are 0.01, 0.023, 0.025, 0.26, 6, and 6 [MHz]. As in Equations 2 to 4, in a case where the number of bandwidths increases by calculating a mean value and a standard deviation value of the bandwidths other than the six bandwidths, a variance value (i.e., a representative value) may be about 6.8 MHz.

The following Table 1 shows a classification learning result of a modulation signal performed based on some bandwidths by using a random forest of a supervised learning model.

TABLE 1

| Bandwidth [MHz] | Learning/Test |
|---|---|
| 1.0 | 0.985/0.905 |
| 2.0. | 0.990/0.915 |
| 3.0 | 0.994/0.943 |
| 5.0 | 0.996/0.968 |

TABLE 1-continued

| Bandwidth [MHz] | Learning/Test |
|---|---|
| 10.0 | 0.995/0.939 |
| 20.0 | 0.997/0.926 |

Considering a bandwidth setting standard of equipment used to obtain a signal, it may be seen that classification performance is best in 5.0 MHz closest to the representative value (about 6.8 MHz) where a difference between a learning rate and a test rate is small, in terms of optimization and generalization.

In using machine learning for classifying a modulation signal, the present invention may be very useful for a case where a learning rate difference based on a value and a method of determining a bandwidth used to obtain a classification target signal are analyzed and a modulation type of an arbitrary signal where a bandwidth is not known should be predicted.

The apparatus and the method according to the embodiments of the present invention may be implemented as a software module or an algorithm.

Methods implemented with a software module or an algorithm may be stored, as computer-readable codes or program instructions executable by the processor, in a computer-readable recording medium.

Here, the computer-readable recording medium may include a magnetic storage medium (for example, read-only memory (ROM), random access memory (RAM), floppy disk, hard disk, etc.) and an optical read medium (for example, CD-ROM, digital versatile disk (DVD), etc.). The computer-readable recording medium may be stored and executed as a code which is distributed to a computer system connected to a computer communication network and is readable by using a distributed scheme. The recording medium may be readable by a computer, stored in a memory, and executed by a processor.

Moreover, the apparatus and the method according to the embodiments of the present invention may be represented by various functional block elements and various processing steps unlike the embodiment of FIGS. 1 to 3.

Such functional blocks may be implemented with a number of hardware or/and software elements for executing specific functions. For example, the embodiments may use integrated circuit elements, such as a memory, processing, logic, a lookup table, for executing various functions on the basis of control by one or more microprocessors or various control devices.

According to the embodiments of the present invention, modulation (recognition or prediction) schemes of a plurality of modulation signals may be classified (recognized or predicted) through a classifier learned based on machine learning by using, as training data, I/Q data sampled with a single sampling frequency in a multi-frequency environment, and thus, the modulation type of each of the plurality of modulation signals may be quickly classified (recognized or predicted).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of classifying a modulation type of a classification target signal by using a single sampling frequency in a receiving apparatus, the method comprising:
   extracting I data having an in-phase component and Q data having a quadrature-phase component, sampled with a single sampling frequency, from the classification target signal received from a transmitting apparatus by using a preprocessor; and
   analyzing features of the extracted I data and Q data to classify a modulation type of the classification target signal by using a classifier learned based on a machine learning method.

2. The method of claim 1, wherein the extracting comprises:
   obtaining bandwidth values available in wireless communication between the transmitting apparatus and the receiving apparatus;
   calculating a mean value of the bandwidth values;
   calculating a variance value of the bandwidth values and the mean value;
   determining the calculated variance value as the single sampling frequency; and
   extracting the I data and the Q data on the basis of the determined single sampling frequency.

3. The method of claim 2, wherein the calculating of the mean value of the bandwidth values comprises further generating the calculated mean value to increase a number of bandwidth values, so that the bandwidth values have a normal distribution characteristic.

4. The method of claim 1, further comprising, before the extracting, allowing the classifier to learn by using the machine learning method,
   wherein the allowing the classifier to learn comprises:
   preparing training data including the I data and the Q data sampled with the single sampling frequency; and
   allowing the classifier to learn by using the training data.

5. The method of claim 4, wherein the single sampling frequency is a variance value of bandwidth values available in wireless communication between the transmitting apparatus and the receiving apparatus and a mean value of the bandwidth values.

6. A method of determining a single sampling frequency for extracting I data having an in-phase component and Q data having a quadrature-phase component input to a classifier in an apparatus including the classifier predicting a modulation type of a classification target signal by using a single sampling frequency in a receiving apparatus, the method comprising:
   calculating a mean value and a standard deviation value of a plurality of bandwidth values of the classification target signal;
   calculating a variance value of the bandwidth values, the mean value, and the standard deviation value; and
   determining the calculated variance value as the single sampling frequency.

7. The method of claim 6, wherein the calculating of the mean value and the standard deviation value comprises further generating a bandwidth value corresponding to the calculated mean value and a bandwidth value corresponding to the standard deviation value to increase a number of bandwidth values, so that the bandwidth values have a normal distribution characteristic.

8. A receiving apparatus for classifying a modulation type of a classification target signal by using a single sampling frequency, the receiving apparatus comprising:
   a preprocessor configured to extract I data having an in-phase component and Q data having a quadrature-phase component, sampled with the single sampling frequency, from the classification target signal received from a transmitting apparatus; and a classifier configured to analyze features of the extracted I data and Q data to classify a modulation type of the classification target signal.

9. The receiving apparatus of claim 8, wherein the preprocessor comprises:

a first calculator configured to calculate a mean value of bandwidth values available in wireless communication between the transmitting apparatus and the receiving apparatus;

a second calculator configured to calculate a variance value of the bandwidth values and the mean value; and an extractor configured to determine the variance value as the single sampling frequency and extract the I data and the Q data sampled with the determined single sampling frequency.

10. The receiving apparatus of claim 8, wherein the preprocessor comprises:

a first calculator configured to calculate a mean value and a standard deviation value of bandwidth values available in wireless communication between the transmitting apparatus and the receiving apparatus;

a second calculator configured to calculate a variance value of the bandwidth values, the mean value, and the standard deviation value; and an extractor configured to determine the variance value as the single sampling frequency and extract the I data and the Q data sampled with the determined single sampling frequency.

11. The receiving apparatus of claim 8, wherein the classifier learns based on machine learning by using training data including the I data and the Q data sampled with the single sampling frequency.

12. The receiving apparatus of claim 11, wherein the machine learning is supervised learning.

13. The receiving apparatus of claim 8, further comprising a demodulator configured to perform demodulation on the classification target signal on the basis of the modulation type of the classification target signal classified by the classifier.

* * * * *